United States Patent
Al-Duwaish et al.

(10) Patent No.: US 9,075,407 B2
(45) Date of Patent: Jul. 7, 2015

(54) REDUCED COMPLEXITY AUTO-TUNING PROCESS CONTROLLER SYSTEM AND METHOD

(71) Applicant: KING FAHD UNIVERSITY OF PETROLEUM AND MINERALS, Dhahran (SA)

(72) Inventors: Hussain Al-Duwaish, Dhahran (SA); Syed Z. Rizvi, Karachi (PK)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 431 days.

(21) Appl. No.: 13/714,232

(22) Filed: Dec. 13, 2012

(65) Prior Publication Data

US 2014/0172126 A1    Jun. 19, 2014

(51) Int. Cl.
G05B 13/02    (2006.01)

(52) U.S. Cl.
CPC .................................. G05B 13/0265 (2013.01)

(58) Field of Classification Search
CPC .................................................. G05B 13/0255
USPC ........................................................ 700/37, 72
See application file for complete search history.

(56) References Cited

U.S. PATENT DOCUMENTS

| 5,481,453 | A | 1/1996 | Desantis | |
| 6,081,751 | A | 6/2000 | Luo et al. | |
| 6,810,366 | B2 * | 10/2004 | Kendrick et al. | 702/190 |
| 7,142,931 | B2 * | 11/2006 | Frutiger | 700/72 |
| 2006/0265085 | A1 * | 11/2006 | Chen | 700/41 |
| 2009/0198386 | A1 | 8/2009 | Kim et al. | |

* cited by examiner

*Primary Examiner* — Robert Fennema
*Assistant Examiner* — Sivalingam Sivanesan
(74) *Attorney, Agent, or Firm* — Richard C Litman

(57) ABSTRACT

The reduced complexity auto-tuning process controller system and method is a control scheme in which, for each process variable, a single gain K, which is initialized with a sufficiently small value, is iteratively auto-tuned using a predetermined discrete sample time and learning rate. A plant error is calculated and summed with an output of a one-sample delay, the sum being input to the one-sample delay. The combined output of the one-sample delay is multiplied by the input signal, i.e., used as a gain constant of the control input signal. The control input signal times this gain constant is fed to the plant input, thereby reducing error in the plant.

3 Claims, 2 Drawing Sheets

REDUCED COMPLEXITY AUTO-TUNING PROCESS CONTROLLER SYSTEM AND METHOD

BACKGROUND OF THE INVENTION

1. Field of the Invention

The present invention relates to process control methods, and particularly to a reduced complexity auto-tuning process controller system and method that uses a reduced number of constants for auto-tuning.

2. Description of the Related Art

In today's industrial world, Proportional Integral (PI) controllers remain by far, the most commonly used classical feedback controllers in the industry, especially for chemical process with slow dynamics. A PI controller, or for that matter, a P-Only controller, calculates the deviation error between a measured process variable and the desired setpoint of the variable. This error is then sought to be minimized by properly tuning the gains of the controller.

A typical three-term controller (e.g., a PID controller) involves tuning of three gains, namely the proportional, the integral and the derivative values, denoted by $K_P$, $K_I$, and $K_D$. In process control, usually, the first two terms, the $K_P$, $K_I$ are sufficient, and hence, are used most commonly. These gains are usually interpreted in terms of time-based response. The gain $K_P$, depends on the current value of error, while the gain $K_I$, depends on the accumulation of past errors. The weighted sum of these actions is used to adjust the actuator in order to minimize the deviation error. The basic equation for the PI controller is therefore given by:

$$Gc(s) = K_P \left\{ 1 + \frac{1}{K_i s} \right\} \quad (1)$$

The gains $K_P$ and $K_I$ are the proportional and integral gains respectively, and are positive parameters. In order to tune the gains, a control engineer must have knowledge of the process or system under consideration. Hence, the control engineer needs to know the characteristics of the process. Even in the absence of knowledge of the underlying process, a PI controller is often thought of as the best controller.

In industrial practice, real-time control imposes a time constraint on the performance of the controller. This means that since control decisions are taken in real-time, it is of high importance that high computation machines are available to sample data, acquire data, compute control decisions based on the acquired data, and finally take a decision, all within a small sampling time rate. Sampling time should be small enough to make sure that system dynamics are not missed in-between samples. For the controller to be able to compute all of this in limited time, it needs to harbor computation power. Computation complexity is therefore of tantamount importance. Hence, for the commonly used PI controller, the aim is to reduce the computation complexity required to tune the gains $K_P$ and $K_I$.

Thus, a reduced complexity auto-tuning process controller system and method solving the aforementioned problems is desired.

SUMMARY OF THE INVENTION

The reduced complexity auto-tuning process controller system and method is a control scheme in which, for each process variable, only a single gain K, which is initialized with a sufficiently small value, is iteratively auto-tuned using a predetermined discrete sample time and learning rate. A plant error is calculated and summed with an output of a one-sample delay, the sum being input to the one-sample delay. The combined output of the one-sample delay is multiplied by the input signal, i.e., used as a gain constant of the control input signal. The control input signal times this gain constant is fed to the plant input.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
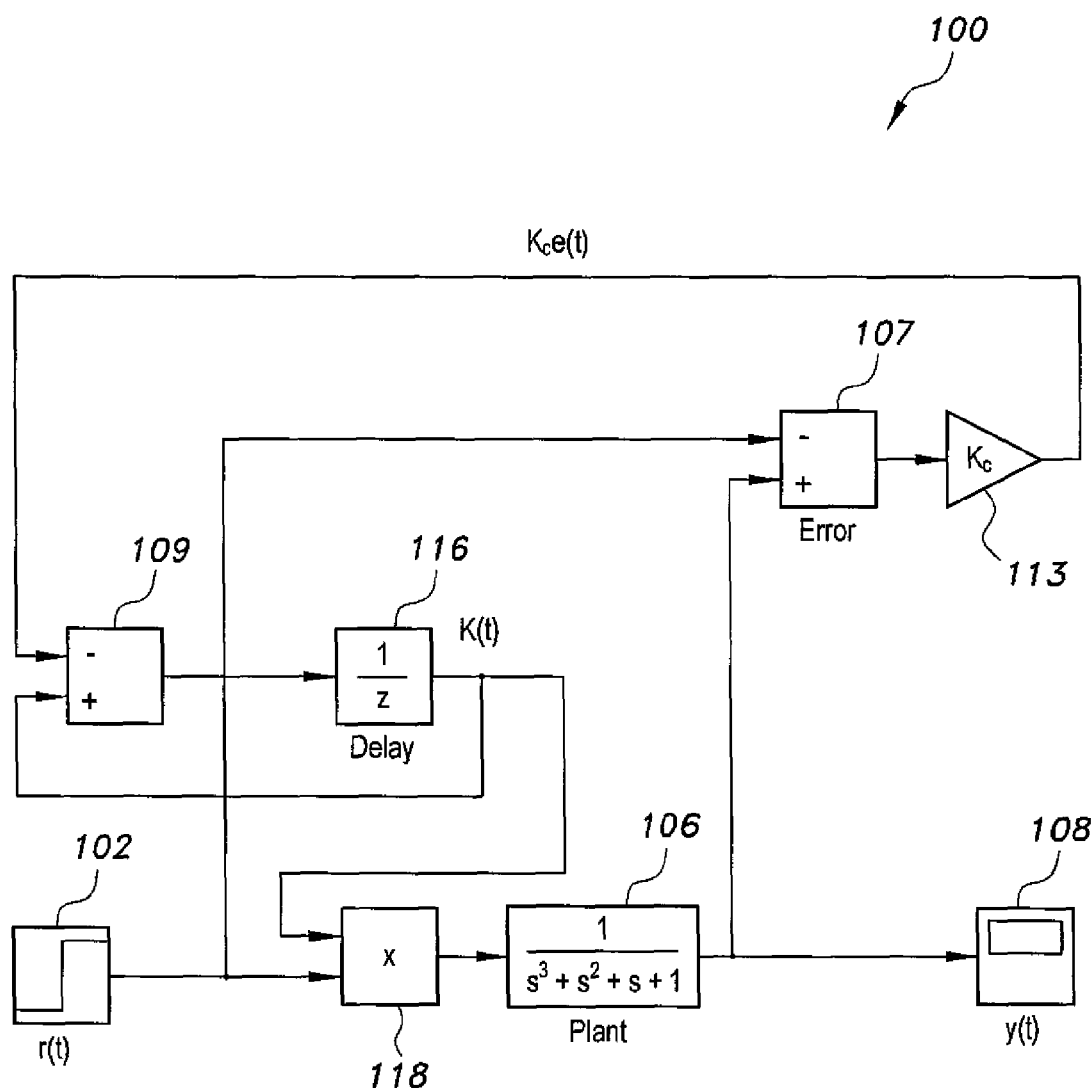
FIG. 1 is a block diagram of a reduced complexity auto-tuning process controller system according to the present invention.

The reduced complexity auto-tuning process controller system and method is a control scheme in which, for each process variable, only a single gain K, which is initialized with a sufficiently small value, is iteratively auto-tuned using a predetermined discrete sample time and learning rate. A plant error is calculated and summed with an output of a one-sample delay, the sum being input to the one-sample delay. The combined output of the one-sample delay is multiplied by the input signal, i.e., used as a gain constant of the control input signal. The control input signal times this gain constant is fed to the plant input, thereby reducing error in the plant. The control method utilizes iterative control according to the following law:

$$K(t+1) = K(t) - K_C e(t), \quad (2)$$

where $K_C$ is the learning rate and index t denotes discrete-time sample. A block diagram for the present reduced complexity auto-tuning process controller system 100 is shown in FIG. 1. The present controller arrangement includes a control input r(t) 102 applied to the plant 106 via a gain constant multiplier 118. The plant output y(t) 108 will control plant equipment. The plant output 108 is also fed to an error summation unit 107 in which non-inverted plant output 108 is summed with an inverted control input r(t) 102, the result being fed to a constant gain amplifier 113 having gain $K_C$, which represents the controller's learning rate.

The output of the constant gain amplifier 113 is fed to an error feedback summation unit 109, where the amplified error signal $K_C e(t)$ is inverted and feed to a $z^{-1}$ sample delay unit 116, wherein its output is the tunable gain constant K(t), which is fed forward to a multiplier 118 and fed back to the error feedback summation unit 109. This arrangement leads to the relation characterized by equation (2), and the nature of the feedback from the sample delay unit 116 results in the iterative correction to the tunable gain constant K(t), which is applied to the control input r(t) 102 via the gain constant multiplier 118. Thus, proportional and integral control gains of the prior art are replaced by a single control gain, K(t).

Figure 2:
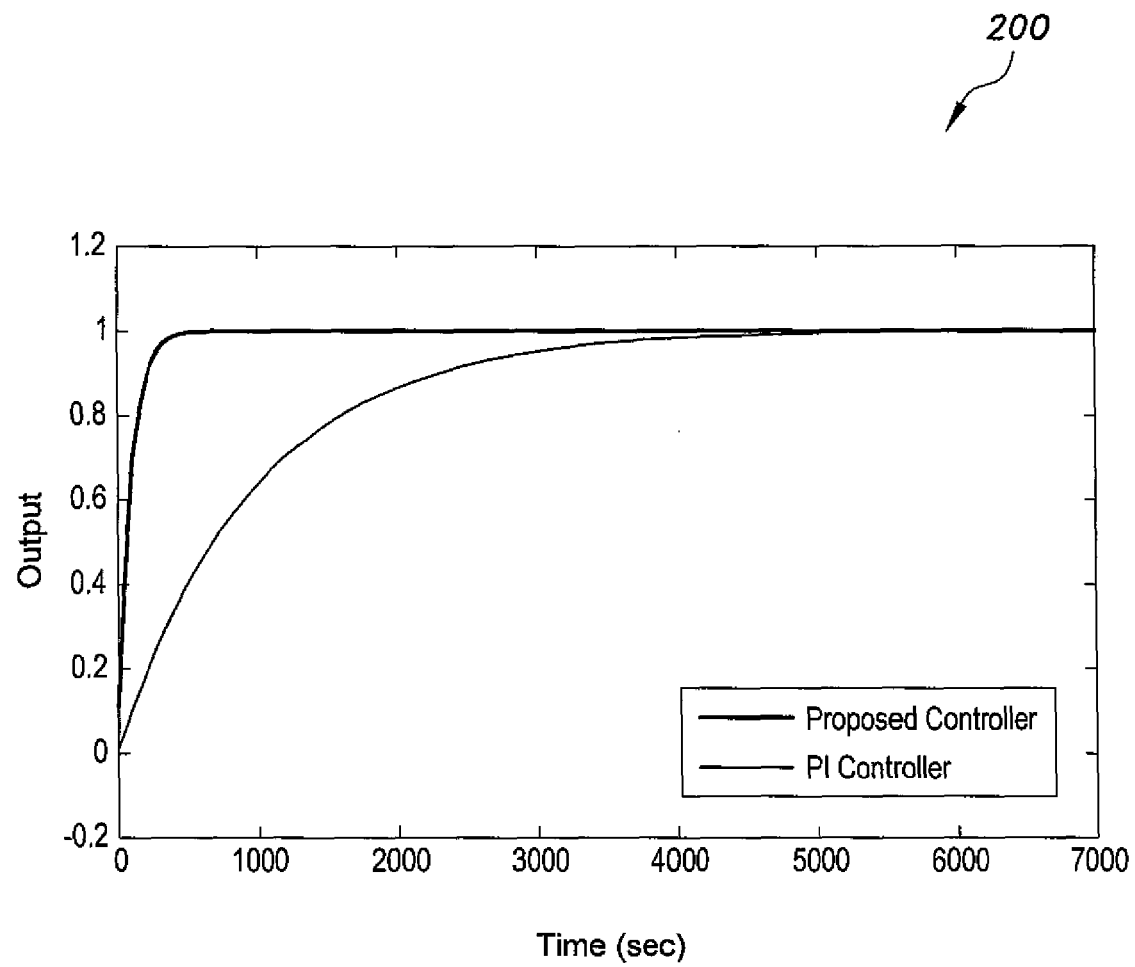
FIG. 2 is a comparison plot showing a comparison of the response produced by the reduced complexity auto-tuning process controller according to the present invention to a conventional PI controller.

Plot 200 of FIG. 2 shows a response of a third order process to a step-disturbance. The PI controller is tuned using one of the well-established tuning methods, while the proposed new controller is auto-tuned according to the control law given in equation (2). As is evident, the present control scheme provides a vast improvement on settling time, as compared to the PI controller, by tuning just one gain, instead of two.

This principle is of immense industrial significance. Comparable or even better results can be obtained by tuning half the number of gains than are required in a PI controller, so that the performance of the controller can be achieved at much less cost and lower computational requirements.

It should be understood by one of ordinary skill in the art that embodiments of the present method can comprise software or firmware code executing on a computer, a microcontroller, a microprocessor, or a DSP processor; state machines implemented in application specific or programmable logic; or numerous other forms. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

It is to be understood that the present invention is not limited to the embodiments described above, but encompasses any and all embodiments within the scope of the following claims.

We claim:

1. A reduced complexity auto-tuning process controller method, comprising the steps of:

computing a plant error $K_C e(t)$ based on plant output $y(t)$ and control input $r(t)$;

summing the plant error $K_C e(t)$ with a single-sample delay, $$\frac{1}{z},$$

the output of which is characterized by an auto-tunable gain constant $K(t)$; and multiplying the control input signal $r(t)$ by the auto-tunable gain constant $K(t)$, thereby resulting in automatic iterative control of the plant output $y(t)$, wherein the process controller performs process control of the plant according to a control law governed by the relation $K(t+1)=K(t)-K_C e(t)$.

2. A computer software product, comprising a non-transitory medium readable by a processor, the non-transitory medium having stored thereon a set of instructions for performing a reduced complexity auto-tuning process control method, the set of instructions including:

(a) a first sequence of instructions which, when executed by the processor, causes said processor to compute a plant error $K_C e(t)$ based on plant output $y(t)$ and control input $r(t)$;

(b) a second sequence of instructions which, when executed by the processor, causes said processor to sum the plant error $K_C e(t)$ with a single-sample delay, $$\frac{1}{z},$$

the output of which is characterized by an auto-tunable gain constant $K(t)$; and (c) a third sequence of instructions which, when executed by the processor, causes said processor to multiply the control input signal $r(t)$ by the auto-tunable gain constant $K(t)$, thereby resulting in automatic iterative control of the plant output $y(t)$, wherein the process controller performs process control of the plant according to a control law governed by the relation $K(t+1)=K(t)-K_C e(t)$.

3. A reduced complexity auto-tuning process control system, comprising:

means for computing plant error $K_C e(t)$ based on plant output $y(t)$ and control input $r(t)$;

means for summing the plant error $K_C e(t)$ with a single-sample delay, $$\frac{1}{z},$$

the output of which is characterized by an auto-tunable gain constant $K(t)$; and means for multiplying the control input signal $r(t)$ by the auto-tunable gain constant $K(t)$, thereby resulting in automatic iterative control of said plant output $y(t)$, wherein the process control system performs process control of the plant according to a control law governed by the relation $K(t+1)=K(t)-K_C e(t)$.

* * * * *